(12) United States Patent
Matsumoto

(10) Patent No.: US 7,610,625 B2
(45) Date of Patent: Oct. 27, 2009

(54) PROGRAM CONTROL SYSTEM, PROGRAM CONTROL METHOD AND INFORMATION CONTROL PROGRAM

(75) Inventor: Hidehiro Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 621 days.

(21) Appl. No.: 10/212,085

(22) Filed: Aug. 6, 2002

(65) Prior Publication Data

US 2003/0031153 A1    Feb. 13, 2003

(30) Foreign Application Priority Data

Aug. 7, 2001    (JP)    ............... 2001-239396

(51) Int. Cl.
*G06F 11/36* (2006.01)
*H04L 29/00* (2006.01)

(52) U.S. Cl. ........................ 726/25; 713/153
(58) Field of Classification Search ............ 713/153
See application file for complete search history.

(56) References Cited

U.S. PATENT DOCUMENTS

| | | | | |
|---|---|---|---|---|
| 5,359,546 | A * | 10/1994 | Hayes et al. | 702/123 |
| 5,371,883 | A * | 12/1994 | Gross et al. | 714/38 |
| 5,680,453 | A | 10/1997 | Akiyama et al. | |
| 5,805,891 | A * | 9/1998 | Bizuneh et al. | 717/121 |
| 6,115,471 | A | 9/2000 | Oki et al. | |
| 6,182,245 | B1 * | 1/2001 | Akin et al. | 714/38 |
| 6,324,647 | B1 * | 11/2001 | Bowman-Amuah | 726/23 |
| 6,460,090 | B1 * | 10/2002 | Cuomo et al. | 719/328 |
| 6,484,024 | B1 * | 11/2002 | Darnault et al. | 455/418 |
| 6,502,124 | B1 * | 12/2002 | Shimakawa et al. | 709/203 |
| 6,601,017 | B1 * | 7/2003 | Kennedy et al. | 702/182 |
| 6,748,580 | B1 * | 6/2004 | Sur et al. | 717/105 |
| 6,775,536 | B1 * | 8/2004 | Geiger et al. | 455/411 |
| 6,859,922 | B1 * | 2/2005 | Baker et al. | 717/121 |
| 7,099,663 | B2 * | 8/2006 | Lundblade et al. | 455/425 |
| 7,150,008 | B2 * | 12/2006 | Cwalina et al. | 717/126 |
| 2002/0013908 | A1 * | 1/2002 | Nishihata et al. | 713/201 |

(Continued)

FOREIGN PATENT DOCUMENTS

JP    8-55164 A    2/1996

(Continued)

*Primary Examiner*—Emmanuel L Moise
*Assistant Examiner*—Jeffrey Williams
(74) *Attorney, Agent, or Firm*—Foley & Lardner LLP

(57) ABSTRACT

A program control system is capable of preventing an invalid program from being downloaded to a mobile terminal. When a programmer applies for the certification and registration of a developed program, a gateway sends a checking program for checking the validity of program to the programmer. After having been notified that the program had passed the check from the programmer, the gateway accepts the registration of the program, and requests a cipher key database to send a public key. Having received the public key from the cipher key database, the gateway sends the program with the public key to a server to register the program. When a mobile terminal requests for the program, the gateway accesses the server to obtain the program with the public key. Subsequently, the gateway sends the public key to the cipher key database to authenticate the public key by use of a companion cipher key stored therein. The gateway downloads the program to the mobile terminal only when the public key is authenticated and thereby the program proves to be valid.

33 Claims, 10 Drawing Sheets

U.S. PATENT DOCUMENTS

| | | |
|---|---|---|
| 2002/0023259 A1* | 2/2002 | Shimizu et al. ............. 717/126 |
| 2002/0116293 A1* | 8/2002 | Lao et al. ....................... 705/27 |
| 2002/0184486 A1* | 12/2002 | Kershenbaum et al. ..... 713/150 |
| 2003/0220939 A1* | 11/2003 | Nagao ..................... 707/104.1 |
| 2004/0073662 A1* | 4/2004 | Falkenthros ................ 709/224 |
| 2004/0255138 A1 | 12/2004 | Nakae |
| 2005/0223392 A1* | 10/2005 | Cox et al. .................. 719/328 |
| 2006/0101520 A1* | 5/2006 | Schumaker et al. ........... 726/25 |

FOREIGN PATENT DOCUMENTS

| | | |
|---|---|---|
| JP | 10-214297 A | 8/1998 |
| JP | 2000-47854 A | 2/2000 |
| JP | 2000-48076 A | 2/2000 |

* cited by examiner

F I G. 7
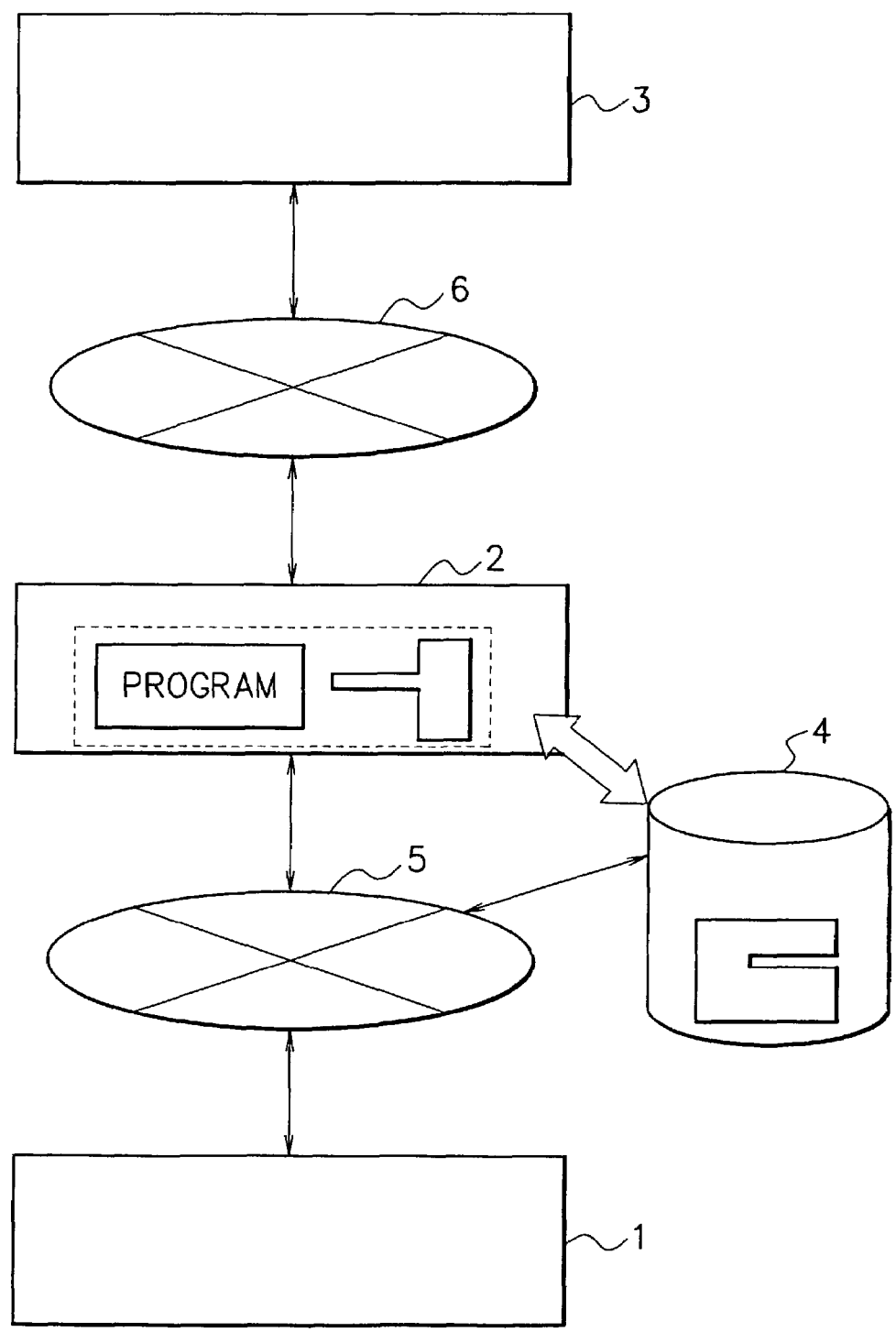

PROGRAM CONTROL SYSTEM, PROGRAM CONTROL METHOD AND INFORMATION CONTROL PROGRAM

FIELD OF THE INVENTION

The present invention relates to a system and method of program control for downloading a program stored in a server on a network to a mobile terminal that dispatches a communication by wireless, and an information control program.

BACKGROUND OF THE INVENTION

In recent years, there has been proposed mobile terminals having a function for accessing a server on a network, particularly on the Internet, to obtain information.

Downloading of information to the mobile terminals is accompanied by a variety of services to users, such as video clip/music information delivery, enhanced security in financial or commercial transactions that require the strict confidentiality, and the like.

FIG. 1 is a diagram showing an example of the system configuration for accessing a server S on a network N with the use of a mobile terminal T.

As can be seen in FIG. 1, a gateway G is placed at an access point to the network N from the mobile terminal T.

The gateway G and the mobile terminal T communicate via a wireless communications line. A communications protocol called WAP (Wireless Application Protocol), which is optimized according to characteristics of the wireless communications line and mobile terminal, is applied to the wireless communications line. Besides, communication is established between the server S and the gateway G over a standard protocol on the network N. For example, if the network N is the Internet, an Internet protocol such as HTTP (HyperText Transfer Protocol), TCP (Transmission Control Protocol) or the like is employed.

The gateway G is provided with the protocol conversion function for carrying out the conversion of WAP into the standard protocol on the network N or vice versa. The gateway G also performs the data conversion function. For example, the gateway G converts an HTML document into a WML (Wireless Markup Language) document when the server S stores documents in HTML, or converts a WML document in text format into the one in binary format to compress the data when the server S stores WML documents as text.

In this system, a wide variety of services can be offered. On the other hand, the mobile terminal T cannot completely reject, if any, erroneous programs and malicious modules when downloading. An error or disruptive code in the downloaded program may cause damage to the telephone function of the mobile terminal T.

In order to avoid such malfunction, there is proposed an environment for the mobile terminal, in which the area for implementing basic functions such as the telephone function is separated from the area for storing and executing downloaded programs as shown in FIG. 2.

Even with this environment, however, a failure in the area for the program executing function could harm the basic functions when both the areas are operated in the same OS (Operating System). Therefore, the environment cannot provide perfect protective measures.

SUMMARY OF THE INVENTION

It is therefore an object of the present invention to provide a program control system capable of rejecting erroneous or disruptive programs, a program control method, and an information control program.

In accordance with the first aspect of the present invention, to achieve the above object, there is provided a program control system comprises: a server set up on a network, and a gateway which obtains a program registered with the server via the network to transfer the program to a mobile terminal via a wireless communications line; wherein the gateway registers a developed program with the server when receiving information from a programmer that the developed program has passed a prescribed checking program for registration.

In accordance with the second aspect of the present invention, in the first aspect, the gateway attaches a registration number for identifying each program to the developed program, transfers the developed program to the server to register the program with the server, and informs the programmer of the registration number.

In accordance with the third aspect of the present invention, there is provided a program control system comprises: a server set up on a network, and a gateway which obtains a program registered with the server via the network to transfer the program to a mobile terminal via a wireless communications line; wherein the gateway attaches a registration number to a developed program, registers the developed program with the server, and informs a programmer who developed the program of the registration number.

In accordance with the fourth aspect of the present invention, in one of the first to third aspects, the program control system further comprises a cipher key database for generating a pair of a public key and a cipher key by request from the gateway, and transferring the public key to the gateway while storing the cipher key; wherein the gateway attaches the public key received from the cipher key database to the developed program, and registers the developed program with the server.

In accordance with the fifth aspect of the present invention, in one of the first to third aspects, the gateway generates a pair of a public key and a cipher key, attaches the public key to the developed program while storing the cipher key, and registers the developed program with the server.

In accordance with the sixth aspect of the present invention, in one of the first to third aspects, the gateway generates a pair of a public key and a cipher key, enciphers the developed program with the public key while storing the cipher key, and registers the developed program with the server.

In accordance with the seventh aspect of the present invention, in the fourth aspect, the gateway accesses the server by request from a mobile terminal to send a program, obtains the program with the public key, transfers the public key to the cipher key database to authenticate the public key with reference to the cipher key, and sends the program to the mobile terminal only when the public key is authenticated.

In accordance with the eighth aspect of the present invention, in the fifth aspect, the gateway accesses the server by request from a mobile terminal to send a program, obtains the program with the public key, authenticates the public key with reference to the stored cipher key, and sends the program to the mobile terminal only when the public key is authenticated.

In accordance with the ninth aspect of the present invention, in the sixth aspect, the gateway accesses the server by request from a mobile terminal to send a program, obtains the program which was enciphered with the public key, decodes the obtained program with the stored cipher key, and sends the program to the mobile terminal.

In accordance with the tenth aspect of the present invention, in the seventh aspect, the cipher key database authenticates the public key received from the gateway with reference to the stored cipher key, and sends back an authentication code that proves the validity of the program to the gateway when the public key is authenticated; the gateway sends the program with the authentication code to the mobile terminal.

In accordance with the eleventh aspect of the present invention, in the eighth aspect, the gateway attaches an authentication code that proves the validity of the program to the program when the public key is authenticated, and sends the program to the mobile terminal.

In accordance with the twelfth aspect of the present invention, there is provided a program control method applied to a system that comprises a server set up on a network, and a gateway which obtains a program registered with the server via the network to transfer the program to a mobile terminal via a wireless communications line; comprising the step of, at the gateway, registering a developed program with the server on receipt of information from a programmer that the developed program has passed a prescribed checking program for registration.

In accordance with the thirteenth aspect of the present invention, in the twelfth aspect, the program control method further comprises the steps of at the gateway, attaching a registration number for identifying each program to the developed program, transferring the developed program to the server to register the program with the server, and informing the programmer of the registration number attached to the program.

In accordance with the fourteenth aspect of the present invention, there is provided a program control method applied to a system that comprises a server set up on a network, and a gateway which obtains a program registered with the server via the network to transfer the program to a mobile terminal via a wireless communications line; comprising the steps of: at the gateway, attaching a registration number to a developed program, registering the program with the server, and informing a programmer who developed the program of the registration number.

In accordance with the fifteenth aspect of the present invention, in one of the twelfth to fourteenth aspects, the program control method applied to the system further comprising a cipher key database; further comprises the steps of: at the cipher key database, generating a pair of a public key and a cipher key by request from the gateway, and transferring the public key to the gateway while storing the cipher key; at the gateway, attaching the public key received from the cipher key database to the developed program, and registering the developed program with the server.

In accordance with the sixteenth aspect of the present invention, in one of the twelfth to fourteenth aspects, the program control method further comprises the steps of: at the gateway, generating a pair of a public key and a cipher key, attaching the public key to the developed program while storing the cipher key, and registering the developed program with the server.

In accordance with the seventeenth aspect of the present invention, in one of the twelfth to fourteenth aspects, the program control method further comprises the steps of: at the gateway, generating a pair of a public key and a cipher key, enciphering the developed program with the public key while storing the cipher key, and registering the developed program with the server.

In accordance with the eighteenth aspect of the present invention, in the fifteenth aspect, the program control method further comprises the steps of: at the gateway, accessing the server by request from a mobile terminal to send a program, obtaining the program with the public key, transferring the public key to the cipher key database to authenticate the public key with reference to the cipher key, and sending the program to the mobile terminal only when the public key is authenticated.

In accordance with the nineteenth aspect of the present invention, in the sixteenth aspect, the program control method further comprises the steps of: at the gateway, accessing the server by request from a mobile terminal to send a program, obtaining the program with the public key, authenticating the public key with reference to the stored cipher key, and sending the program to the mobile terminal only when the public key is authenticated.

In accordance with the twentieth aspect of the present invention, in the seventeenth aspect, the program control method further comprises the steps of: at the gateway, accessing the server by request from a mobile terminal to send a program, obtaining the program which was enciphered with the public key, decoding the obtained program with the stored cipher key, and sending the program to the mobile terminal.

In accordance with the twenty-first aspect of the present invention, in the eighteenth aspect, the program control method further comprises the steps of: at the cipher key database, authenticating the public key received from the gateway with reference to the stored cipher key, and sending back an authentication code that proves the validity of the program to the gateway when the public key is authenticated; at the gateway, sending the program with the authentication code to the mobile terminal.

In accordance with the twenty-second aspect of the present invention, in the nineteenth aspect, the program control method further comprises the steps of: at the gateway, attaching an authentication code that proves the validity of the program to the program when the public key is authenticated, and sending the program to the mobile terminal.

In accordance with the twenty-third aspect of the present invention, there is provided an information control program applied to a system that comprises a server set up on a network, and a gateway which obtains a program registered with the server via the network to transfer the program to a mobile terminal via a wireless communications line; for executing the process of, at the gateway, registering a developed program with the server on receipt of information from a programmer that the developed program has passed a prescribed checking program for registration.

In accordance with the twenty-fourth aspect of the present invention, in the twenty-third aspect, the information control program further executes the process of: at the gateway, attaching a registration number for identifying each program to the developed program, transferring the developed program to the server to register the program with the server, and informing the programmer of the registration number attached to the program.

In accordance with the twenty-fifth aspect of the present invention, there is provided an information control program applied to a system that comprises a server set up on a network, and a gateway which obtains a program registered with the server via the network to transfer the program to a mobile terminal via a wireless communications line; for executing the process of: at the gateway, attaching a registration number to a developed program, registering the developed program with the server, and informing a programmer who developed the program of the registration number.

In accordance with the twenty-sixth aspect of the present invention, in one of the twenty-third to twenty-fifth aspects, the information control program applied to the system further comprising a cipher key database; further executes the process of: at the cipher key database, generating a pair of a public key and a cipher key by request from the gateway, and transferring the public key to the gateway while storing the cipher key; at the gateway, attaching the public key received from the cipher key database to the developed program, and registering the developed program with the server.

In accordance with the twenty-seventh aspect of the present invention, in one of the twenty-third to twenty-fifth aspects, the information control program further executes the process of: at the gateway, generating a pair of a public key and a cipher key, attaching the public key to the developed program while storing the cipher key, and registering the developed program with the server.

In accordance with the twenty-eighth aspect of the present invention, in one of the twenty-third to twenty-fifth aspects, the information control program further executes the process of: at the gateway, generating a pair of a public key and a cipher key, enciphering the developed program with the public key while storing the cipher key, and registering the developed program with the server.

In accordance with the twenty-ninth aspect of the present invention, in the twenty-sixth aspect, the information control program further executes the process of: at the gateway, accessing the server by request from a mobile terminal to send a program, obtaining the program with the public key, transferring the public key to the cipher key database to authenticate the public key with reference to the cipher key, and sending the program to the mobile terminal only when the public key is authenticated.

In accordance with the thirtieth aspect of the present invention, in the twenty-seventh aspect, the information control program further executes the process of: at the gateway, accessing the server by request from a mobile terminal to send a program, obtaining the program with the public key, authenticating the public key with reference to the stored cipher key, and sending the program to the mobile terminal only when the public key is authenticated.

In accordance with the thirty-first aspect of the present invention, in the twenty-eighth aspect, the information control program further executes the process of: at the gateway, accessing the server by request from a mobile terminal to send a program, obtaining the program which was enciphered with the public key, decoding the obtained program with the stored cipher key, and sending the program to the mobile terminal.

In accordance with the thirty-second aspect of the present invention, in the twenty-ninth aspect, the information control program further executes the process of: at the cipher key database, authenticating the public key received from the gateway with reference to the stored cipher key, and sending back an authentication code that proves the validity of the program to the gateway when the public key is authenticated; at the gateway, sending the program with the authentication code to the mobile terminal.

In accordance with the thirty-third aspect of the present invention, in the thirtieth aspect, the information control program further executes the process of: at the gateway, attaching an authentication code that proves the validity of the program to the program when the public key is authenticated, and sending the program to the mobile terminal.

BRIEF DESCRIPTION OF THE DRAWINGS

The objects and features of the present invention will become more apparent from the consideration of the following detailed description taken in conjunction with the accompanying drawings in which:

FIG. 7 is another diagram for illustrating the operation of FIG. 4;

DESCRIPTION OF THE PREFERRED EMBODIMENT

Figure 1:
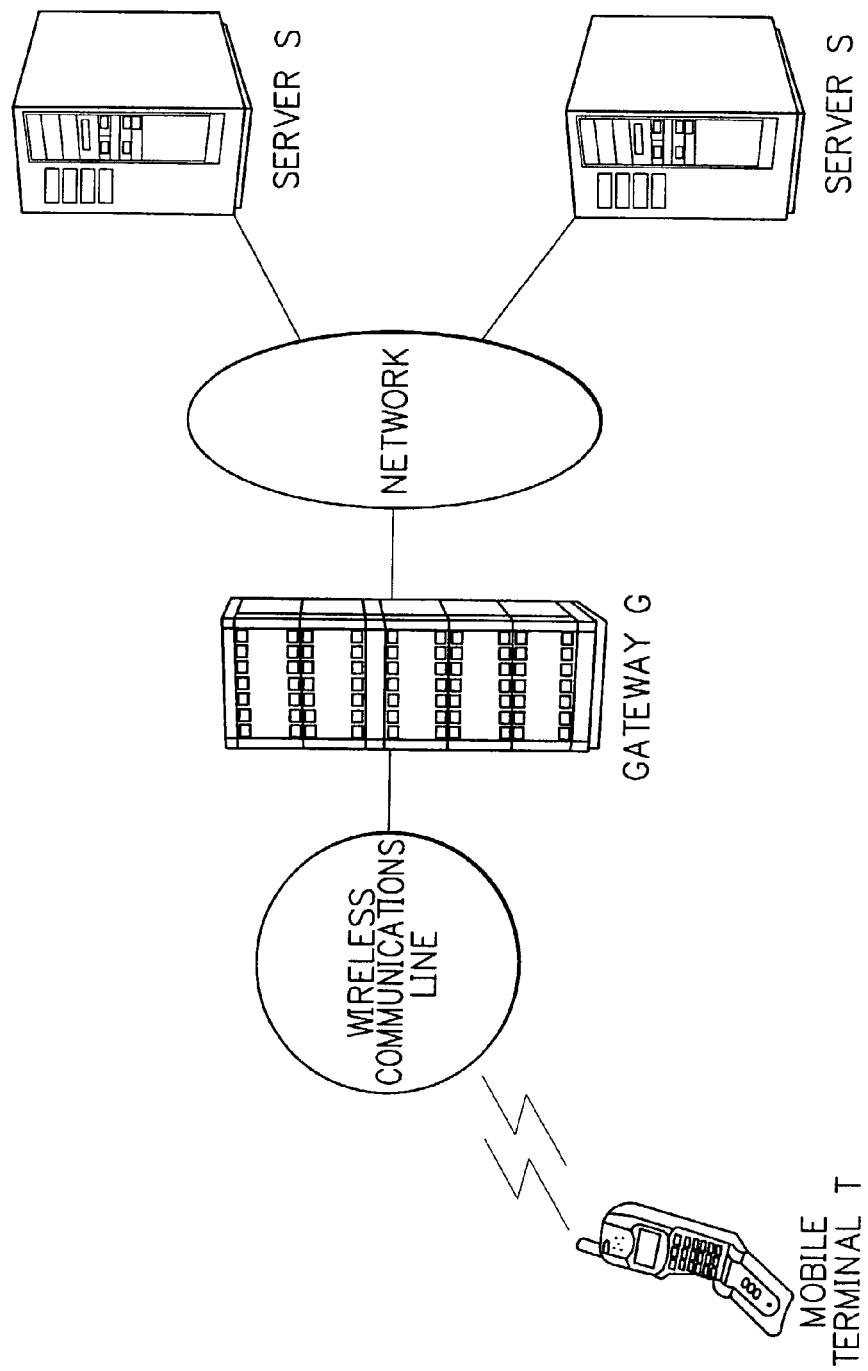
FIG. 1 is a diagram showing the configuration of a conventional system.
Figure 2:
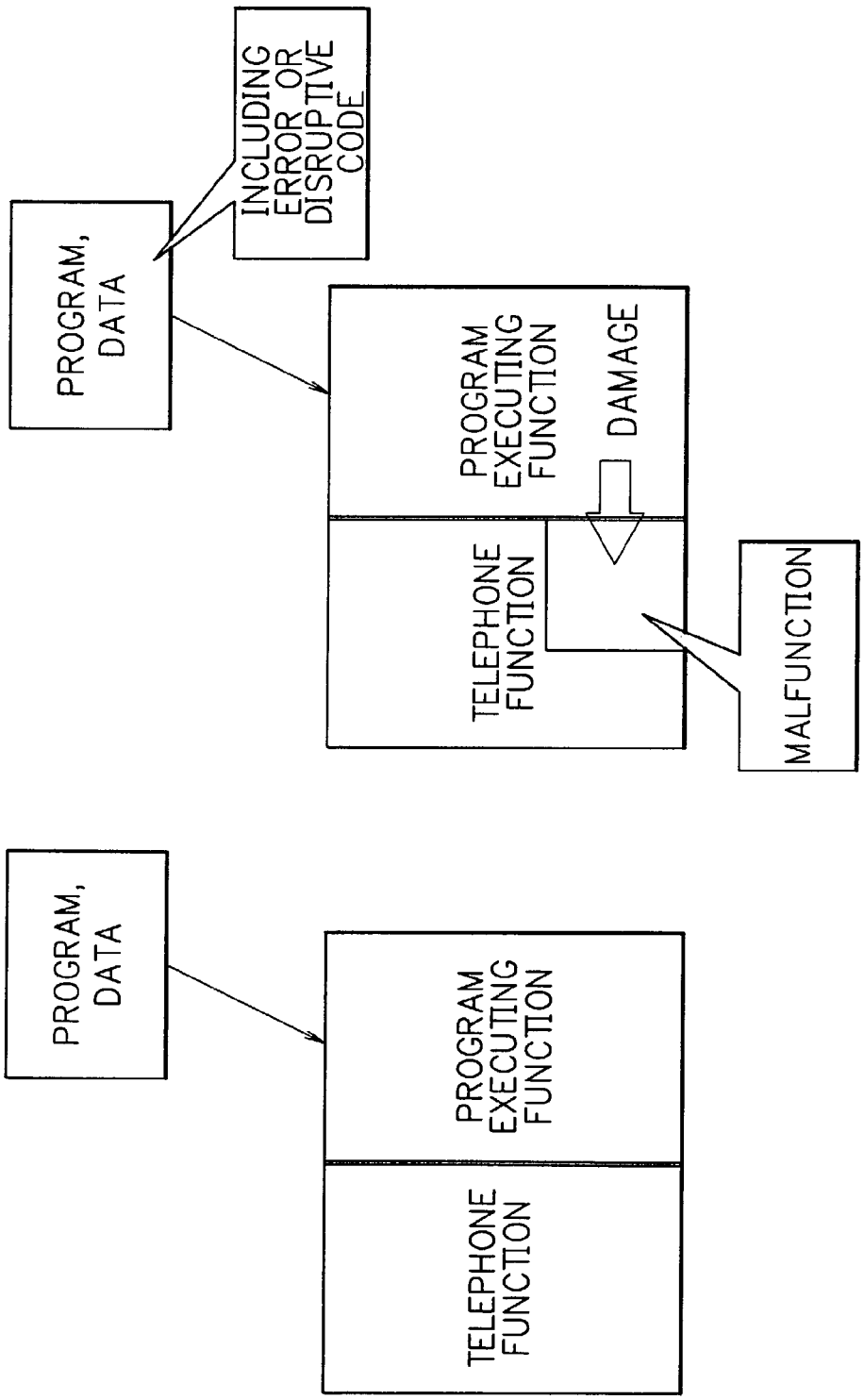
FIG. 2 is a diagram for explaining problems with the conventional system.

Referring now to the drawings, a description of preferred embodiment of the present invention will be given in detail.

Figure 3:
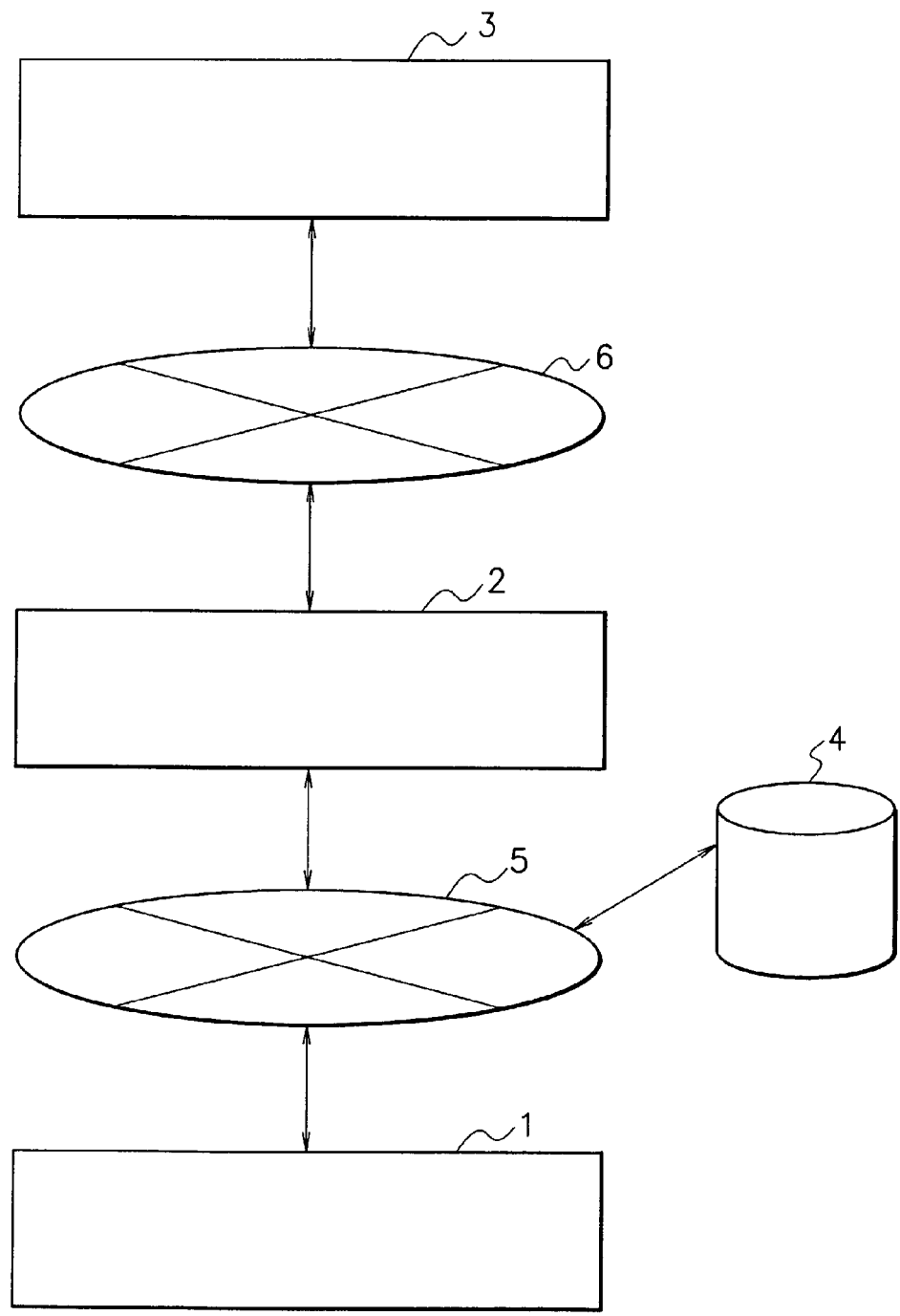
FIG. 3 is a block diagram showing the configuration of a program control system according to an embodiment of the present invention.

FIG. 3 is a block diagram showing the configuration of a program control system according to an embodiment of the present invention. As can be seen in FIG. 3, the program control system comprises a mobile terminal 1 capable of accessing a network 6 as a client, a gateway 2 for carrying out the inter-conversion of communications protocols employed in the network 6 and a wireless communications line 5, a server 3 set up on the network 6, and a cipher key database 4 connected to the wireless communications line 5. The mobile terminal 1 and the gateway 2 communicate with each other via the wireless communications line 5. The gateway 2 and the server 3 are connected to the network 6 (Internet, etc.). Besides, the gateway 2 and the cipher key database 4 are connected via the wireless communications line 5.

The mobile terminal 1 has a specific built-in program to execute therein. The mobile terminal 1 has access to the server 3 through the gateway 2 to obtain a program stored in the server 3. When the program can be run normally or utilizable, the mobile terminal 1 displays this information on the display screen.

The gateway 2 includes a memory (cache memory, etc.) for temporarily storing programs obtained from the server 3 or developed programs sent from programmers. The gateway 2 carries out the registration number generating function for generating registration numbers that identify respective programs stored in the server 3, and the communication function for transferring programs each having a public key and the registration number to the server 3 via the network 6. Moreover, the gateway 2 carries out data conversion function in addition to these functions and the above-mentioned protocol conversion function. For example, the gateway 2 converts an HTML document into a WML document when the server 3 stores documents in HTML, or converts a WML document in text format into the one in binary format to compress the data when the server 3 stores WML documents as text.

The server 3 registers each program or data with the public key and registration number for the program transferred from the gateway 2.

The cipher key database 4 generates the public key and a cipher key by request from the gateway 2, and stores the cipher key therein. Besides, the cipher key database 4 authenticates the public key attached to a program based on the stored cipher key. When the public key is authenticated, the validity of the program is acknowledged, and the cipher key database 4 issues authentication (authentication code) that proves the validity of the program. Incidentally, the cipher key database 4 is operated and managed by a communications carrier, and contents of the register are not open to the public.

With this configuration, it is made possible to prevent basic functions (telephone function, etc.) of the mobile terminal 1 from being damaged by an error, disruptive module or code, etc. in a program when the mobile terminal 1 downloads programs or data from the server 3.

Referring next to FIGS. 4 to 10, the operation of the program control system according to the embodiment of the present invention will be explained.

Figure 4:
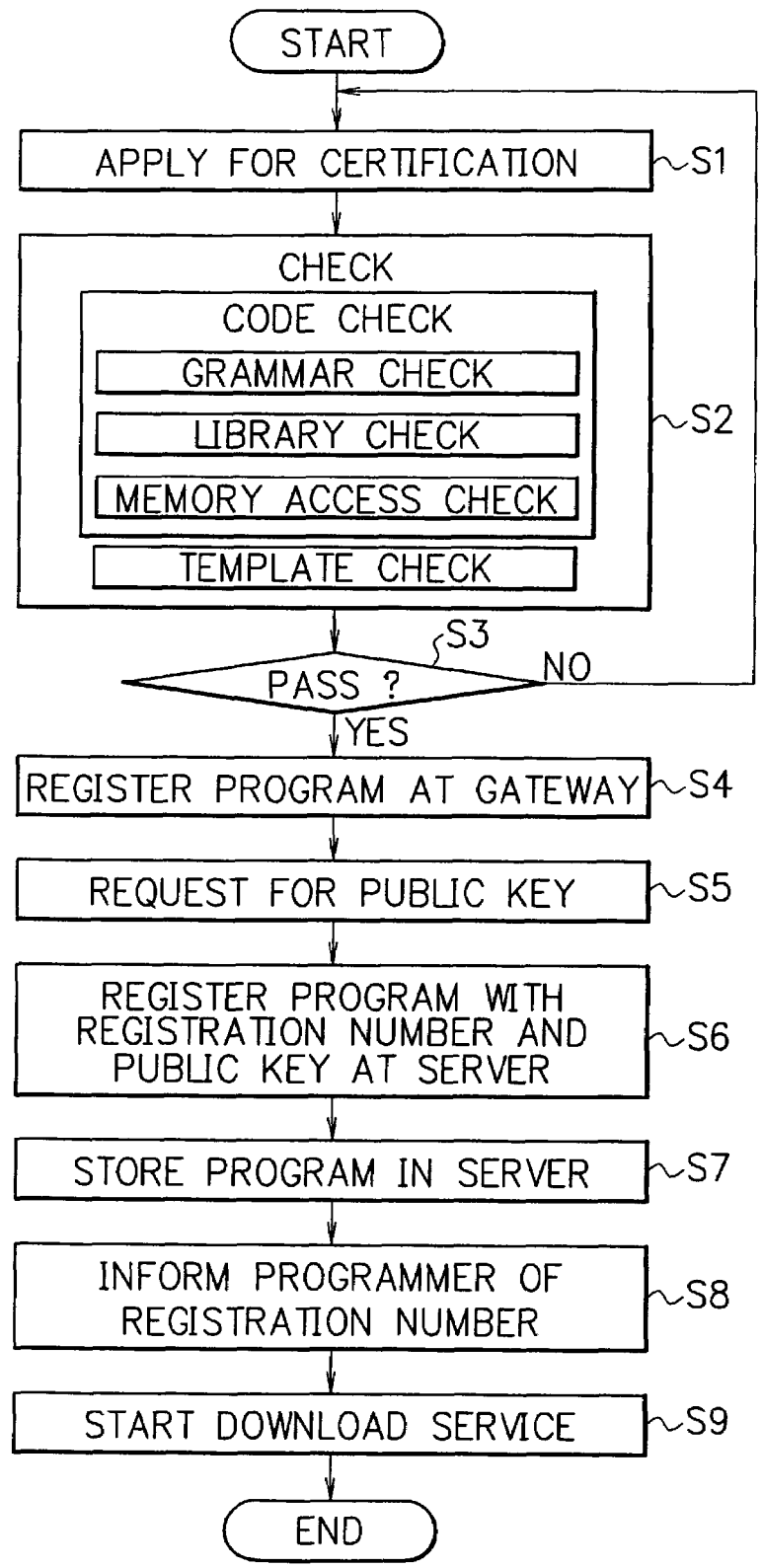
FIG. 4 is a flowchart for explaining the operation to register a program with a server.

FIG. 4 is a flowchart for explaining the operation of the system for registering a developed program with the server 3.

In this embodiment, the programmer of the developed program examines the program with the use of a prescribed checking program. First, the programmer applies to the gateway 2 for the certification and registration of the developed program (step S1). The gateway 2 sends a checking program, which satisfies check specifications described below, to the programmer. The programmer examines the developed program by the checking program (step S2).

Incidentally, while in this embodiment, the certification and registration of the developed program is applied for at the gateway 2, the application may be made to a server administrator, a gateway administrator, a communications carrier, or a provider who is responsible for the program or data offered to the client through the download service.

The check specifications of the checking program include at least a code check for checking codes of the program and data, and a template check for checking whether the program follows coding rules appropriate to attributes (the size of the screen, number of colors, input method, line speed, and transmission speed, etc.) of the mobile terminal 1. Besides, the code check includes at least a grammar check for grammatical errors in the codes, a library check for checking if there is a native function call being directly related to the basic functions or OS other than downloading function, and a memory access check conducted according to memory access rules for checking, for example, whether the work area of the program does not exceed the available area in the built-in memory of the mobile terminal 1 even when multiple abnormal processing originates.

Figure 6:
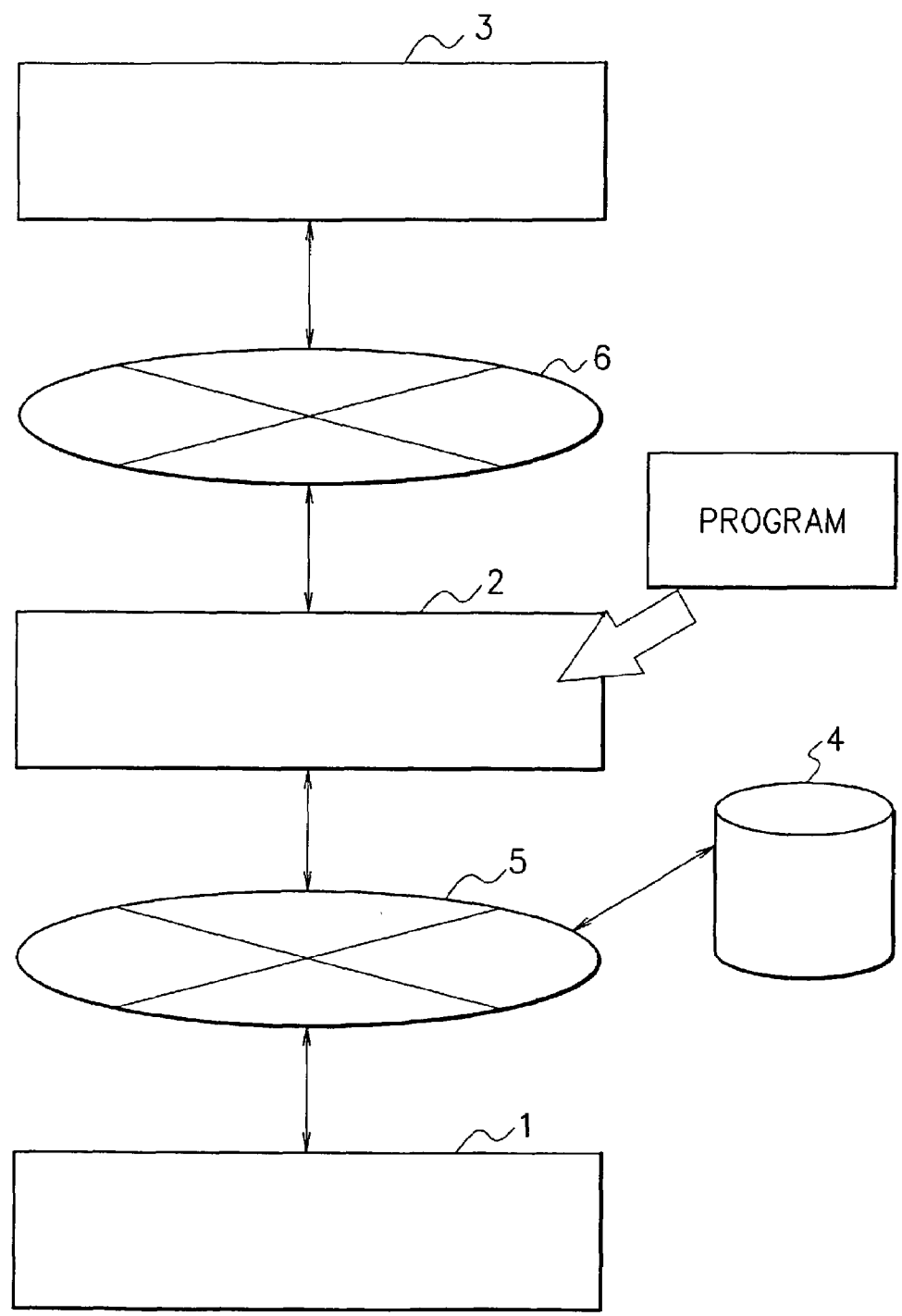
FIG. 6 is a diagram for illustrating the operation of FIG. 4.

When the developed program passes the check including the above-mentioned check items (step S3, YES), the programmer registers the program at the gateway 2 (step S4). The gateway 2 temporarily stores the developed program sent from the programmer in the memory, and requests the cipher key database 4 to send a public key (step S5). FIG. 6 illustrates the situation where a program developed by a programmer is registered at the gateway 2.

The cipher key database 4 generates a pair of the public key and cipher key by request from the gateway 2. Subsequently, the cipher key database 4 stores the cipher key therein, and transfers the public key to the gateway 2 via the wireless communications line 5. FIG. 7 illustrates the situation where a public key generated by the cipher key database 4 has been transferred to the gateway 2.

Figure 8:
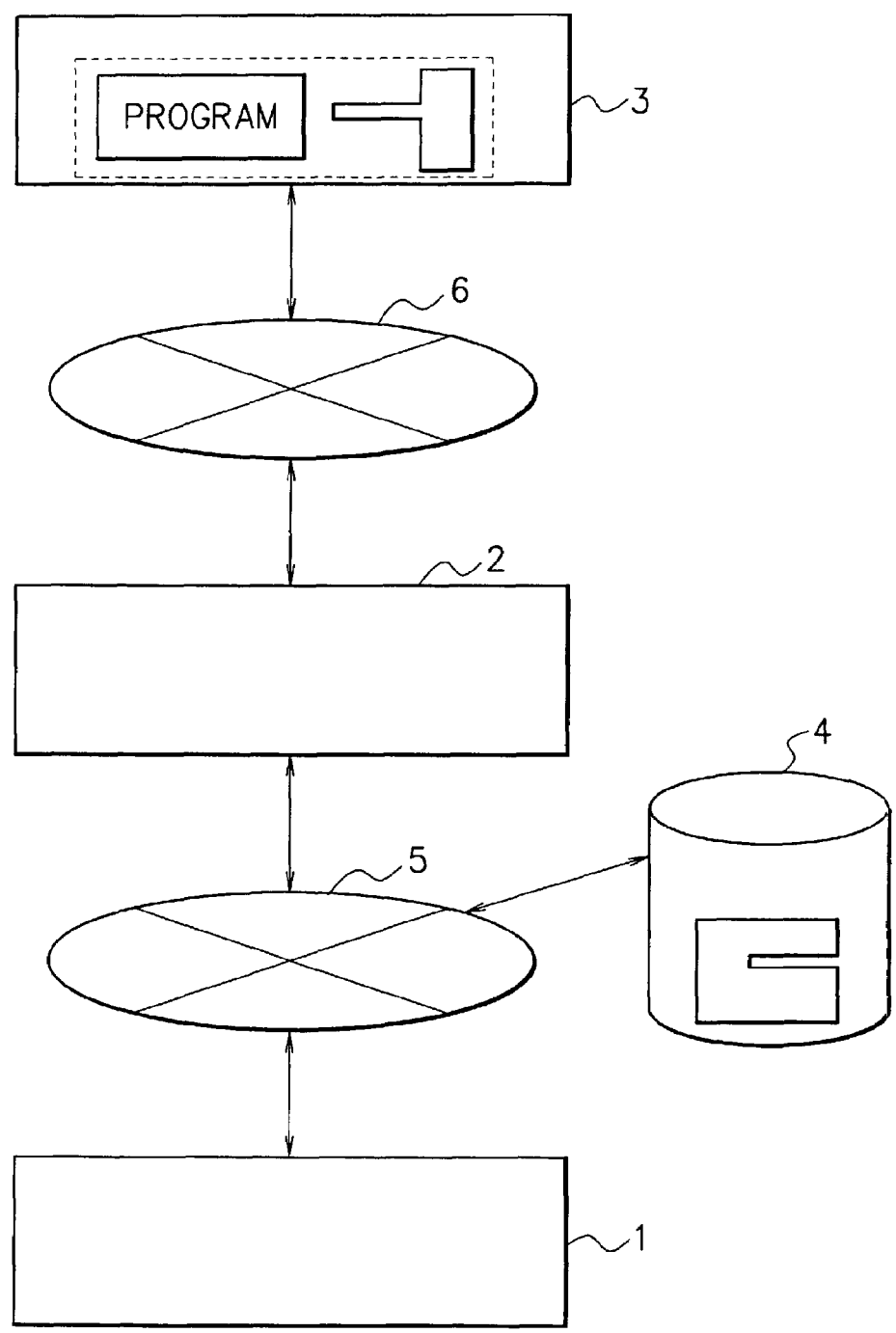
FIG. 8 is a yet another diagram for illustrating the operation of FIG. 4.

Having received the public key from the cipher key database 4, the gateway 2 generates a registration number for identifying the developed program, and then sends the developed program with the registration number and public key to the server 3 through the network 6 (step S6). The server 3 stores the developed program with the registration number and public key received from the gateway 2 in the memory (step S7). After that, the server 3 gives the gateway 2 a registration notice to inform that the program has been normally registered. FIG. 8 illustrates the situation where an encrypted program has been transferred to the server 3 and stored therein.

Having received the registration notice from the server 3, the gateway 2 informs the programmer, who applied for the certification and registration of the developed program, of the completion of the registration and the registration number for the program (step S8). At the point of informing the programmer of the registration number, the gateway 2 commences the download service of the registered program (step S9). With this a series of operations for registering a program is completed.

Next, a description will be given of the operation of the program control system for downloading a registered program to the mobile terminal 1.

Figure 5:
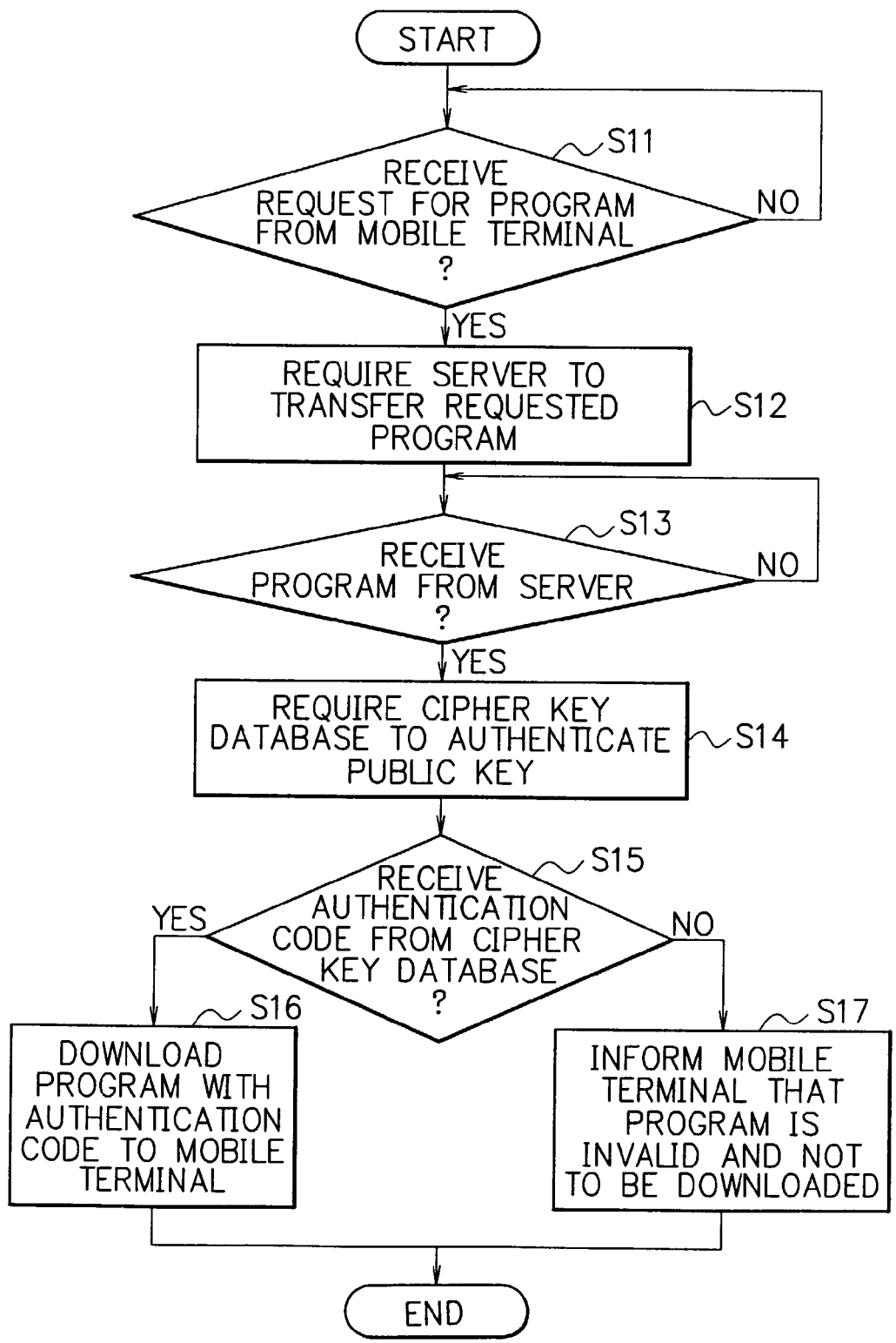
FIG. 5 is a flowchart for explaining the operation to send a program to a mobile terminal.

FIG. 5 is a flowchart for explaining the operation of the system to deliver a program to the mobile terminal 1.

Figure 9:
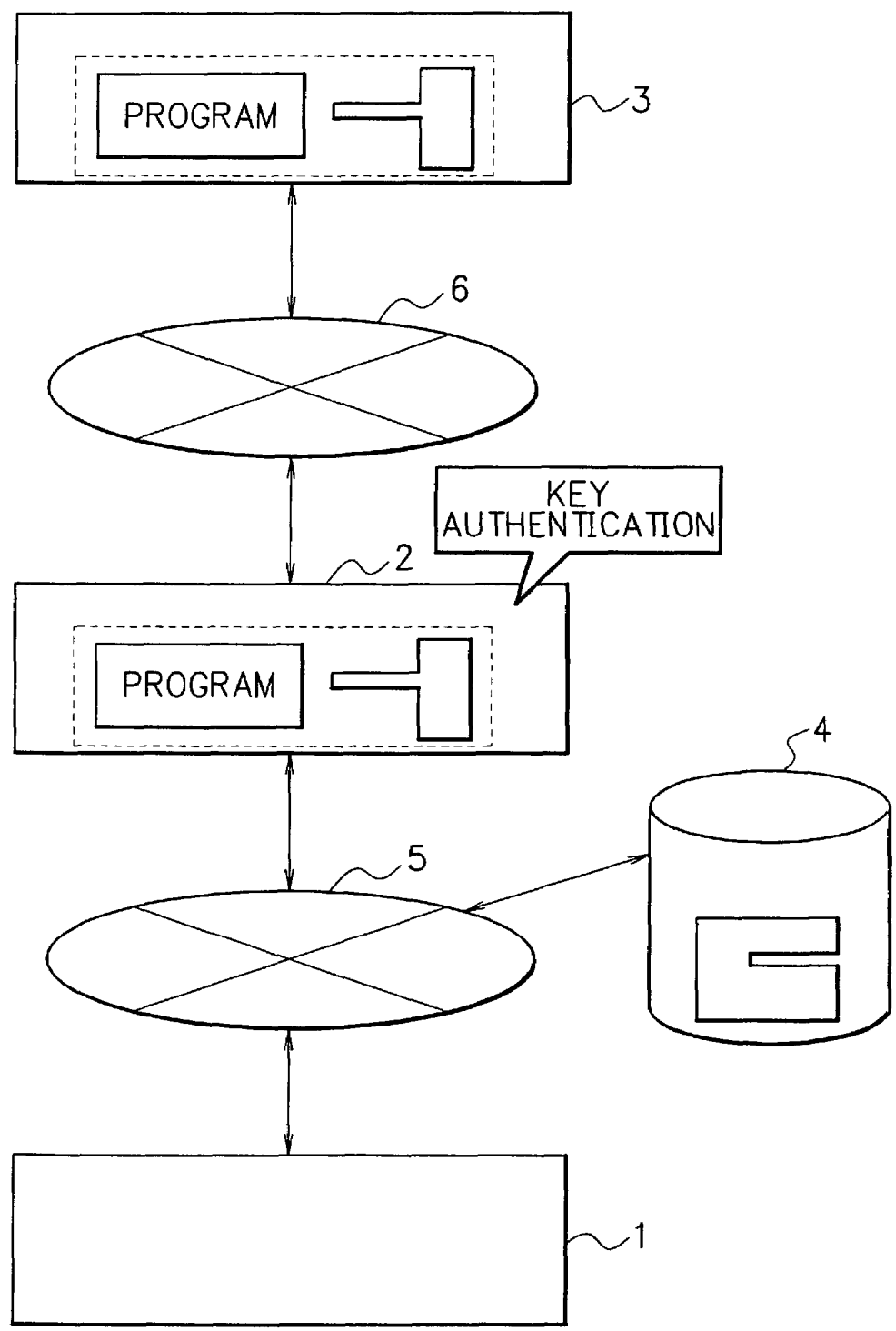
FIG. 9 is a diagram for illustrating the operation of FIG. 5.

Having received a request for a program from the mobile terminal 1 via the wireless communications line 5 (step S11, YES), the gateway 2 accesses the server 3 to require the transfer of the requested program (step S12). The server 3 transfers the program with a public key and a registration number to the gateway 2 at request from the gateway 2. FIG. 9 illustrates the situation where a requested program transferred from the server 3 is stored in the gateway 2.

Having received the requested program from the server 3 (step S13, YES), the gateway 2 notifies the mobile terminal 1 that the program downloading operation is to be suspended, and requires the cipher key database 4 to authenticate the public key attached to the program (step S14). The cipher key database 4 receives the public key from the gateway 2, and authenticates the public key by use of a companion cipher key stored therein to verify whether or not the program transferred from the server 3 is valid.

When having determined that the program is valid based on the key authentication, the cipher key database 4 sends back an authentication code that proves the validity of the program to the gateway 2. On the other hand, when the public key is not authenticated, the cipher key database 4 informs the gateway 2 that the program is not valid.

Figure 10:
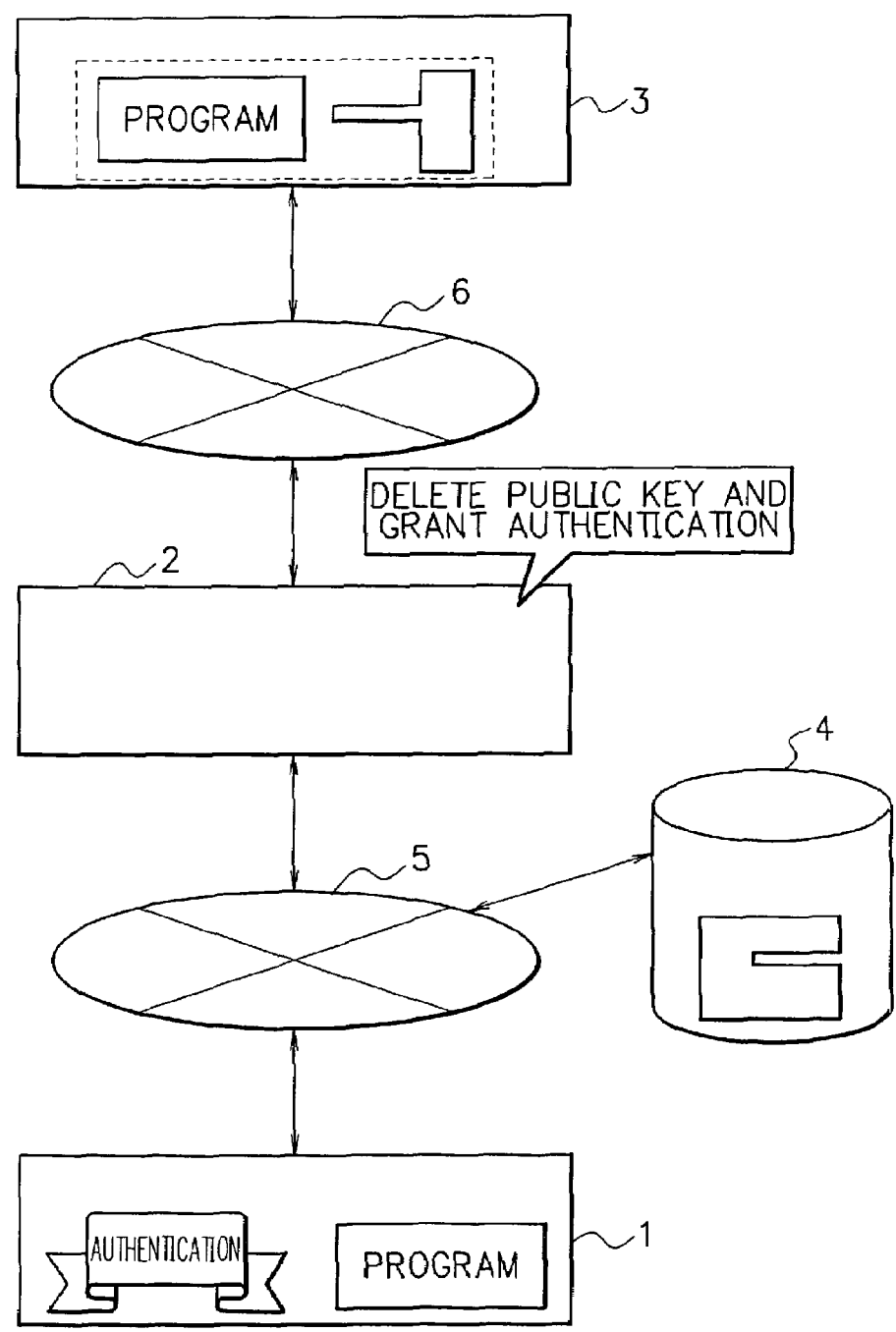
FIG. 10 is another diagram for illustrating the operation of FIG. 5.

Having received the authentication code from the cipher key database 4 (step S15, YES), the gateway 2 downloads the program with the authentication code to the mobile terminal 1 (step S16). Meanwhile, when having the decision of the cipher key database 4 that the program is not valid (step S15, NO), the gateway 2 informs the mobile terminal 1 that the program is invalid and not to be downloaded (step S17). FIG. 10 illustrates the situation where a program authenticated by the cipher key database 4 has been downloaded to the mobile terminal 1.

As set forth hereinabove, in accordance with the present invention, only programs that have passed the check by the checking program are registered with the server 3. Consequently, it is possible to reject disruptive programs that are intended to damage the system, and also prevent programs or data that could cause a malfunction of the mobile terminal 1 from being downloaded thereto.

Besides, with this construction, programs are always registered with the server 3 under monitoring by the gateway 2, and therefore unspecified programmers cannot register erroneous programs at the server 3. Thus, the integrity of the server 3 can be maintained.

Moreover, even when an erroneous program was registered and downloaded to the mobile terminal 1, the program could be immediately deleted from the server 3 with reference to the registration number attached to the program. Incidentally, programmers may be specified so as to obviate such problems.

Furthermore, since an authentication code is attached to respective downloaded programs, users acknowledge the validity of the programs and enjoy the security. The authentication code is also usable for copyright protection such as the elimination of pirated copies.

Furthermore, where the checking program is open to programmers, the programmers can enhance their ability to develop programs to pass the check. In addition, when executed by the programmers for checking their programs, the checking program can also be checked for defects. This improves the accuracy of the checking program.

Furthermore, the provider of the system confirms each program examined by its programmer by informing the programmer of a registration number for the program. Thus, the reliability of the examined program is improved.

Furthermore, the provider of the system can dispense with the conventional total check of the registered programs, and also collectively manage the programs at the gateway 2. Thus the strains on the economy can be lightened.

Furthermore, a communications carrier who operates the cipher key database 4 manages cipher keys, which means that the communications carrier also manages public keys indirectly.

While the preferred embodiment of the present invention has been described using specific terms, such description is for illustrative purposes only, and it is to be understood that changes and variations may be made without departing from the spirit or the scope of the present invention.

For example, while in the above embodiment, the gateway 2 is connected to the one server 3, the gateway 2 may be connected to a plurality of servers via a network. Besides, a security system peculiar to the wireless communications line 5 may be employed instead of the authentication according to the public key cryptosystem.

In addition, the wireless communications line does not necessarily connect the gateway 2 and cipher key database 4. The gateway 2 and database 4 may be connected by a fixed leased line, or may be connected via a network such as the Internet.

Moreover, the gateway 2 may be provided with the function of the cipher key database 4, and may generate public keys, cipher keys and authentication codes. In this case, for example, the gateway 2 generates a pair of a public key and a cipher key when receiving a developed program from a programmer, then encrypts the program by the public key, and registers the program with the server 3. When receiving a request for the program from the mobile terminal 1, the gateway 2 sends for the encrypted program from the server 3, and decrypts the program with the cipher key stored therein. If decryption proves successful, the gateway 2 issues authentication, and sends the program with the authentication code to the mobile terminal 1.

Incidentally, the operation as described in connection with FIGS. 4 and 5 is carried out by the information control program stored in the respective gateway 2, server 3 and cipher key database 4.

While preferred embodiment of the present invention has been described, it is not to be restricted by the embodiment. It is to be appreciated that those skilled in the art can change or modify the embodiment without departing from the scope and spirit of the following claims.

What is claimed is:

1. A program control system for transferring programs to a mobile terminal, comprising:
   a server set up on a network; and
   a gateway for obtaining a program registered with the server via the network to transfer the program to the mobile terminal via a wireless communications line;
   wherein the gateway is configured to register the program with the server when receiving information from a programmer, that developed the program, that the program has passed a prescribed checking program for registration, wherein the gateway is configured to provide the prescribed checking program,
   wherein the gateway is configured to register the program with a registration number and with a public key obtained from a cipher key database when the gateway receives information from the mobile terminal that the program has passed the prescribed checking program,
   wherein the cipher key database is configured to generate a pair of a cipher key and the public key upon request to provide the public key to the gateway, and is configured to store the cipher key therein and is configured to transfer the public key to the gateway,
   wherein, upon a request provided to the server by the gateway, the server is configured to transfer the program with the public key and the registration number to the gateway, and
   wherein the gateway is configured to notify the mobile terminal that a program downloading operation is to be suspended until the cipher key database authenticates the public key by use of the companion cipher key stored in the cipher key database to verify whether or not the program is valid.

2. A program control system for transferring programs to a mobile terminal, comprising:
   a server set up on a network; and
   a gateway for obtaining a program registered with the server via the network to transfer the program to the mobile terminal via a wireless communications line,
   wherein when receiving information from a programmer that a program has passed a prescribed checking program for registration, the gateway is configured to attach a registration number and a public key obtained from a cipher key database, for identifying the program and for validating the program, to the program and is configured to transfer the program to the server to register the program with the server, and is configured to inform the programmer of the registration number, wherein the gateway is configured to provide the prescribed checking program,
   wherein the cipher key database is configured to generate a pair of a cipher key and the public key upon request to provide the public key to the gateway, and is configured to store the cipher key therein and is configured to transfer the public key to the gateway,
   wherein, upon a request provided to the server by the gateway, the server is configured to transfer the program with the public key and the registration number to the gateway, and
   wherein the gateway is configured to notify the mobile terminal that a program downloading operation is to be suspended until the cipher key database authenticates the public key by use of the companion cipher key stored in the cipher key database to verify whether or not the program is valid.

3. A program control system for transferring programs to a mobile terminal, comprising:
a server set up on a network; and
a gateway for obtaining a program registered with the server via the network to transfer the program to the mobile terminal via a wireless communications line;
wherein the gateway is configured to attach a registration number and a public key obtained from a cipher key database to the program when a developer of the program certifies that the program has passed a prescribed checking program for use on the mobile terminal, is configured to register the program with the server, and is configured to inform the developer of the program of the registration number, wherein the gateway is configured to provide the prescribed checking program,
wherein the cipher key database is configured to generate a pair of a cipher key and the public key upon request to provide the public key to the gateway, and is configured to store the cipher key therein and is configured to transfer the public key to the gateway,
wherein, upon a request provided to the server by the gateway, the server is configured to transfer the program with the public key and the registration number to the gateway, and
wherein the gateway is configured to notify the mobile terminal that a program downloading operation is to be suspended until the cipher key database authenticates the public key by use of the companion cipher key stored in the cipher key database to verify whether or not the program is valid.

4. The program control system claimed in claim 2 further comprising:
a cipher key database for generating a pair of a public key and a cipher key by request from the gateway, and transferring the public key to the gateway while storing the cipher key; wherein:
the gateway attaches the public key received from the cipher key database to the program, and registers the program with the server.

5. The program control system claimed in claim 2, wherein:
the gateway carries out data conversion of a document from a first format to a second format different from the first format.

6. The program control system claimed in claim 2, wherein:
the checking program provided by the gateway to the mobile terminal is constructed to meet specific display constraints of the mobile terminal, wherein the mobile terminal comprises:
a code check for checking codes of the program and data; and
a template check for checking whether the program follows prescribed coding rules appropriate to attributes of the mobile terminal, and
wherein the code check includes at least a grammar check from grammatical errors in the program, a library check for checking if there is a native function call being directly related to an operating system, and a memory access check for checking whether a work area of the program does not exceed an available area in a memory of the mobile terminal.

7. The program control system claimed in claim 4, wherein:
the gateway accesses the server by request from a mobile terminal for a program, obtains the program with the public key, transfers the public key to the cipher key database to authenticate the public key with reference to the cipher key, and sends the program to the mobile terminal only when the public key is authenticated.

8. The program control system claimed in claim 5, wherein:
the gateway accesses the server by request from a mobile terminal for a program, obtains the program with the public key, authenticates the public key with reference to the stored cipher key, and sends the program to the mobile terminal only when the public key is authenticated.

9. The program control system claimed in claim 6, wherein:
the gateway accesses the server by request from a mobile terminal for a program, obtains the program which was enciphered with the public key, decodes the obtained program with the stored cipher key, and sends the program to the mobile terminal.

10. The program control system claimed in claim 7, wherein:
the cipher key database authenticates the public key received from the gateway with reference to the stored cipher key, and sends back an authentication code that proves the validity of the program to the gateway when the public key is authenticated; and
the gateway sends the program with the authentication code to the mobile terminal.

11. The program control system claimed in claim 8, wherein:
the gateway attaches an authentication code that proves the validity of the program to the program when the public key is authenticated, and sends the program to the mobile terminal.

12. A program control method applied to a system that comprises a server set up on a network, and a gateway for obtaining a program registered with the server via the network to transfer the program to a mobile terminal via a wireless communications line, comprising the step of:
at the gateway, registering the program with the server on receipt of information from a programmer that the program has passed a prescribed checking program for registration which is provided by the gateway,
registering the program with a registration number and a public key obtained from a cipher key database on receipt of the information that the program has passed the prescribed checking program,
generating, by the cipher key database, a pair of a cipher key and the public key upon request to provide the public key to the gateway, and storing the cipher key therein and transferring the public key to the gateway,
transferring, upon a request provided to the server by the gateway, the program with the public key and the registration number to the gateway, and
notifying, by the gateway, the mobile terminal that a program downloading operation is to be suspended until the cipher key database authenticates the public key by use of the companion cipher key stored in the cipher key database to verify whether or not the program is valid.

13. A program control method applied to a system that comprises a server set up on a network, and a gateway for obtaining a program registered with the server via the network to transfer the program to a mobile terminal via a wireless communications line, comprising the steps of:

at the gateway, on receipt of information from a programmer that a program has passed a prescribed checking program for registration, attaching a registration number and a public key obtained from a cipher key database, for identifying the program and for validating the program, to the program wherein the gateway provides the prescribed checking program;

transferring the program to the server to register the program with the server;

informing the programmer of the registration number attached to the program, generating, by the cipher key database, a pair of a cipher key and the public key upon request to provide the public key to the gateway, and storing the cipher key therein and transferring the public key to the gateway, transferring, upon a request provided to the server by the gateway, the program with the public key and the registration number to the gateway, and notifying, by the gateway, the mobile terminal that a program downloading operation is to be suspended until the cipher key database authenticates the public key by use of the companion cipher key stored in the cipher key database to verify whether or not the program is valid.

14. A program control method applied to a system that comprises a server set up on a network, and a gateway for obtaining a program registered with the server via the network to transfer the program to a mobile terminal via a wireless communications line, comprising the steps of:

at the gateway, attaching a registration number and a public key obtained from a cipher key database to a program when a developer of the program certifies that the program has passed a prescribed checking program for use with the mobile terminal wherein the gateway provides the prescribed checking program;

registering the program with the server;

informing the developer of the program of the registration number, generating, by the cipher key database, a pair of a cipher key and the public key upon request to provide the public key to the gateway, and storing the cipher key therein and transferring the public key to the gateway, transferring, upon a request provided to the server by the gateway, the program with the public key and the registration number to the gateway, and notifying, by the gateway, the mobile terminal that a program downloading operation is to be suspended until the cipher key database authenticates the public key by use of the companion cipher key stored in the cipher key database to verify whether or not the program is valid.

15. The program control method claimed in claim 13, applied to the system that further comprises a cipher key database, further comprising the steps of:

at the cipher key database, generating a pair of a public key and a cipher key by request from the gateway;

transferring the public key to the gateway while storing the cipher key;

at the gateway, attaching the public key received from the cipher key database to the program; and registering the program with the server.

16. The program control method claimed in claim 13, further comprising the steps of:

at the gateway, carrying out data conversion of a document from a first format to a second format different from the first format.

17. The program control method claimed in claim 13, wherein the checking program provided by the gateway to the mobile terminal is constructed to meet specific display constraints of the mobile terminal, wherein the mobile terminal comprises:

a code check for checking codes of the program and data; and a template check for checking whether the program follows prescribed coding rules appropriate to attributes of the mobile terminal, and wherein the code check includes at least a grammar check from grammatical errors in the program, a library check for checking if there is a native function call being directly related to an operating system, and a memory access check for checking whether a work area of the program does not exceed an available area in a memory of the mobile terminal.

18. The program control method claimed in claim 15, further comprising the steps of:

at the gateway, accessing the server by request from a mobile terminal for a program;

obtaining the program with the public key;

transferring the public key to the cipher key database to authenticate the public key with reference to the cipher key; and sending the program to the mobile terminal only when the public key is authenticated.

19. The program control method claimed in claim 16, further comprising the steps of:

at the gateway, accessing the server by request from a mobile terminal for a program;

obtaining the program with the public key, authenticating the public key with reference to the stored cipher key; and sending the program to the mobile terminal only when the public key is authenticated.

20. The program control method claimed in claim 17, further comprising the steps of:

at the gateway, accessing the server by request from a mobile terminal for a program;

obtaining the program which was enciphered with the public key;

decoding the obtained program with the stored cipher key; and sending the program to the mobile terminal.

21. The program control method claimed in claim 18, further comprising the steps of:

at the cipher key database, authenticating the public key received from the gateway with reference to the stored cipher key;

sending back an authentication code that proves the validity of the program to the gateway when the public key is authenticated; and at the gateway, sending the program with the authentication code to the mobile terminal.

22. The program control method claimed in claim 19, further comprising the steps of:

at the gateway, attaching an authentication code that proves the validity of the program to the program when the public key is authenticated; and sending the program to the mobile terminal.

23. A computer readable medium storing an information control program, which is applied to a system that comprises a server set up on a network, and a gateway for obtaining a program registered with the server via the network to transfer the program to a mobile terminal via a wireless communications line, for executing the process of:

at the gateway, registering the program with the server on receipt of information from a programmer that the program has passed a prescribed checking program for registration wherein the gateway provides the prescribed checking program, registering the program with a registration number and a public key obtained from a cipher key database on receipt of the information that the program has passed the prescribed checking program, generating, by the cipher key database, a pair of a cipher key and the public key upon request to provide the public key to the gateway, and storing the cipher key therein and transferring the public key to the gateway, transferring, upon a request provided to the server by the gateway, the program with the public key and the registration number to the gateway, and notifying, by the gateway, the mobile terminal that a program downloading operation is to be suspended until the cipher key database authenticates the public key by use of the companion cipher key stored in the cipher key database to verify whether or not the program is valid.

24. A computer readable medium storing an information control program, which is applied to a system that comprises a server set up on a network, and a gateway for obtaining a program registered with the server via the network to transfer the program to a mobile terminal via a wireless communications line, for executing the process of:

at the gateway, on receipt of information from a programmer that a program has passed a prescribed checking program for registration, attaching a registration number and a public key obtained from a cipher key database, for identifying the program and for validating the program, to the program wherein the gateway provides the prescribed checking program;

transferring the program to the server to register the program with the server; and informing the programmer of the registration number attached to the program, generating, by the cipher key database, a pair of a cipher key and the public key upon request to provide the public key to the gateway, and storing the cipher key therein and transferring the public key to the gateway, transferring, upon a request provided to the server by the gateway, the program with the public key and the registration number to the gateway, and notifying, by the gateway, the mobile terminal that a program downloading operation is to be suspended until the cipher key database authenticates the public key by use of the companion cipher key stored in the cipher key database to verify whether or not the program is valid.

25. A computer readable medium storing an information control program, which is applied to a system that comprises a server set up on a network, and a gateway for obtaining a program registered with the server via the network to transfer the program to a mobile terminal via a wireless communications line, for executing the process of:

at the gateway, attaching a registration number and a public key obtained from a cipher key database to a program when a developer of the program certifies that the program has passed a prescribed checking program for use with mobile terminal wherein the gateway provides the prescribed checking program;

registering the program with the server; and informing the developer of the program of the registration number, generating, by the cipher key database, a pair of a cipher key and the public key upon request to provide the public key to the gateway, and storing the cipher key therein and transferring the public key to the gateway, transferring, upon a request provided to the server by the gateway, the program with the public key and the registration number to the gateway, and notifying, by the gateway, the mobile terminal that a program downloading operation is to be suspended until the cipher key database authenticates the public key by use of the companion cipher key stored in the cipher key database to verify whether or not the program is valid.

26. The computer readable medium claimed in claim 24, applied to the system that further comprises a cipher key database, for further executing the process of:

at the cipher key database, generating a pair of a public key and a cipher key by request from the gateway;

transferring the public key to the gateway while storing the cipher key;

at the gateway, attaching the public key received from the cipher key database to the program; and registering the program with the server.

27. The computer readable medium claimed in claim 24, for further executing the process of:

at the gateway, carrying out data conversion of a document from a first format to a second format different from the first format.

28. The computer readable medium claimed in claim 24, wherein the checking program provided by the gateway to the mobile terminal is constructed to meet specific display constraints of the mobile terminal, wherein the mobile terminal comprises:

a code check for checking codes of the program and data; and a template check for checking whether the program follows prescribed coding rules appropriate to attributes of the mobile terminal, and wherein the code check includes at least a grammar check from grammatical errors in the program, a library check for checking if there is a native function call being directly related to an operating system, and a memory access check for checking whether a work area of the program does not exceed an available area in a memory of the mobile terminal.

29. The computer readable medium claimed in claim 26, for further executing the process of:

at the gateway, accessing the server by request from a mobile terminal for a program;

obtaining the program with a public key;

transferring the public key to the cipher key database to authenticate the public key with reference to the cipher key; and sending the program to the mobile terminal only when the public key is authenticated.

30. The computer readable medium claimed in claim 27, for further executing the process of:

at the gateway, accessing the server by request from a mobile terminal for a program;

obtaining the program with a public key;

authenticating the public key with reference to the stored cipher key; and sending the program to the mobile terminal only when the public key is authenticated.

31. The computer readable medium claimed in claim 28, for further executing the process of:

at the gateway, accessing the server by request from a mobile terminal for a program;

obtaining the program which was enciphered with the public key;

decoding the obtained program with the stored cipher key; and sending the program to the mobile terminal.

32. The computer readable medium claimed in claim 29, for further executing the process of:

at the cipher key database, authenticating the public key received from the gateway with reference to the stored cipher key;

sending back an authentication code that proves the validity of the program to the gateway when the public key is authenticated; and at the gateway, sending the program with the authentication code to the mobile terminal.

33. The computer readable medium claimed in claim 30, for further executing the process of:

at the gateway, attaching an authentication code that proves the validity of the program to the program when the public key is authenticated; and sending the program to the mobile terminal.

* * * * *